United States Patent
McCoy et al.

(10) Patent No.: US 9,510,137 B2
(45) Date of Patent: Nov. 29, 2016

(54) SHORT RANGE PEER-TO-PEER COMMUNICATIONS SYSTEM

(71) Applicant: Caterpillar Inc., Peoria, IL (US)

(72) Inventors: Steven R. McCoy, Washington, IL (US); Stephen W. Rector, Metamora, IL (US)

(73) Assignee: Caterpillar Inc., Peoria, IL (US)

( * ) Notice: Subject to any disclaimer, the term of this patent is extended or adjusted under 35 U.S.C. 154(b) by 73 days.

(21) Appl. No.: 14/536,844

(22) Filed: Nov. 10, 2014

(65) Prior Publication Data

US 2016/0134995 A1    May 12, 2016

(51) Int. Cl.
| | |
|---|---|
| *H04B 7/00* | (2006.01) |
| *H04W 4/00* | (2009.01) |
| *H04L 29/08* | (2006.01) |
| *H04W 4/02* | (2009.01) |

(52) U.S. Cl.
CPC ............ *H04W 4/008* (2013.01); *H04L 67/104* (2013.01); *H04W 4/023* (2013.01)

(58) Field of Classification Search
CPC ........... H04L 25/0266; H04L 67/104; H04W 4/008; H04W 4/023
USPC ...................................................... 455/41.2
See application file for complete search history.

(56) References Cited

U.S. PATENT DOCUMENTS

| | | |
|---|---|---|
| 5,646,844 A | 7/1997 | Gudat et al. |
| 6,037,901 A | 3/2000 | Devier et al. |
| 6,532,416 B1 | 3/2003 | Mueller |
| 6,707,378 B2 | 3/2004 | MacNeille et al. |
| 8,170,756 B2 | 5/2012 | Morey et al. |
| 8,280,595 B2 | 10/2012 | Foster et al. |
| 8,364,189 B2 | 1/2013 | Mintah et al. |
| 8,386,134 B2 | 2/2013 | Morey et al. |
| 8,626,406 B2 | 1/2014 | Schleicher et al. |
| 8,649,963 B2 | 2/2014 | Young et al. |
| 8,750,944 B2 | 6/2014 | Rousu et al. |
| 2005/0002354 A1 | 1/2005 | Kelly et al. |
| 2007/0129869 A1 | 6/2007 | Gudat et al. |
| 2009/0140872 A1* | 6/2009 | O'Neal ................. G05B 9/03 340/679 |
| 2012/0139743 A1 | 6/2012 | Rothacher et al. |
| 2013/0061587 A1* | 3/2013 | Jagoda ................. E02F 9/123 60/414 |

* cited by examiner

*Primary Examiner* — Ajibola Akinyemi
(74) *Attorney, Agent, or Firm* — Leydig Voit Mayer, Ltd.

(57) ABSTRACT

A short range peer-to-peer communications system for communicating between mobile machines includes a first machine having a first prime mover, a first ground engaging drive mechanism operatively connected to the first prime mover to propel the first machine about a work site, and a first peer-to-peer transmitter system on the first machine for transmitting a first signal indicative of a characteristic associated with operating of the first machine. A second machine has a second prime mover, a second ground engaging drive mechanism operatively connected to the second prime mover to propel the second machine about the work site, and a second peer-to-peer receiver system for receiving the first signal directly from the first peer-to-peer transmitter system.

19 Claims, 9 Drawing Sheets

SHORT RANGE PEER-TO-PEER COMMUNICATIONS SYSTEM

TECHNICAL FIELD

This disclosure relates generally to a short range peer-to-peer communications system and, more particularly, to a system and method of work operations utilizing a short range peer-to-peer communications system.

BACKGROUND

Machines such as wheel loaders, excavators, dozers, haul trucks, wheel tractor scrapers, etc., are used to perform a variety of tasks, and may move about a work site as they move material and perform other operations at the work site. Two or more machines may interact when performing these tasks. Communication between machines or between the operators of the machines enable the machines to interact in a more efficient manner.

Due to the nature of a work site, communications between machines are sometimes difficult. Direct communications between operators is sometimes intermittent which may increase the time required for such communication. Communications between machines may require the use of nodes or components that are remote from the machines that are attempting to communicate. Such distance may reduce the reliability of the communications and the latency of the signals.

U.S. Patent Publication No. 2005/0002354 discloses an ad-hoc communication network including a plurality of machines that form sub-networks as they travel about the worksite and come within communication range of one another. Collectively, the sub-networks form an overall ad-hoc network that allows the machines to communicate with each other via intermediate nodes overlapped by two or more sub-networks.

The foregoing background discussion is intended solely to aid the reader. It is not intended to limit the innovations described herein, nor to limit or expand the prior art discussed. Thus, the foregoing discussion should not be taken to indicate that any particular element of a prior system is unsuitable for use with the innovations described herein, nor is it intended to indicate that any element is essential in implementing the innovations described herein. The implementations and application of the innovations described herein are defined by the appended claims.

SUMMARY

In one aspect, a short range peer-to-peer communications system for communicating between mobile machines is provided. A first machine includes a first prime mover, a first ground engaging drive mechanism operatively connected to the first prime mover to propel the first machine about a work site, and a first peer-to-peer transmitter system on the first machine for transmitting a first signal indicative of a characteristic associated with operating of the first machine. A second machine includes a second prime mover, a second ground engaging drive mechanism operatively connected to the second prime mover to propel the second machine about the work site, and a second peer-to-peer receiver system for receiving the first signal directly from the first peer-to-peer transmitter system.

In another aspect, a method of communication between mobile machines at a work site includes propelling a first machine about the work site with a first prime mover operatively connected to a first ground engaging drive mechanism and transmitting a first signal with a first peer-to-peer transmitter system on the first machine indicative of a characteristic associated with operating the first machine. The method further includes propelling a second machine about the work site with a second prime mover operatively connected to a second ground engaging drive mechanism and receiving the first signal directly from the first peer-to-peer transmitter system at a second peer-to-peer receiver system on the second machine.

DETAILED DESCRIPTION

Figure 1:
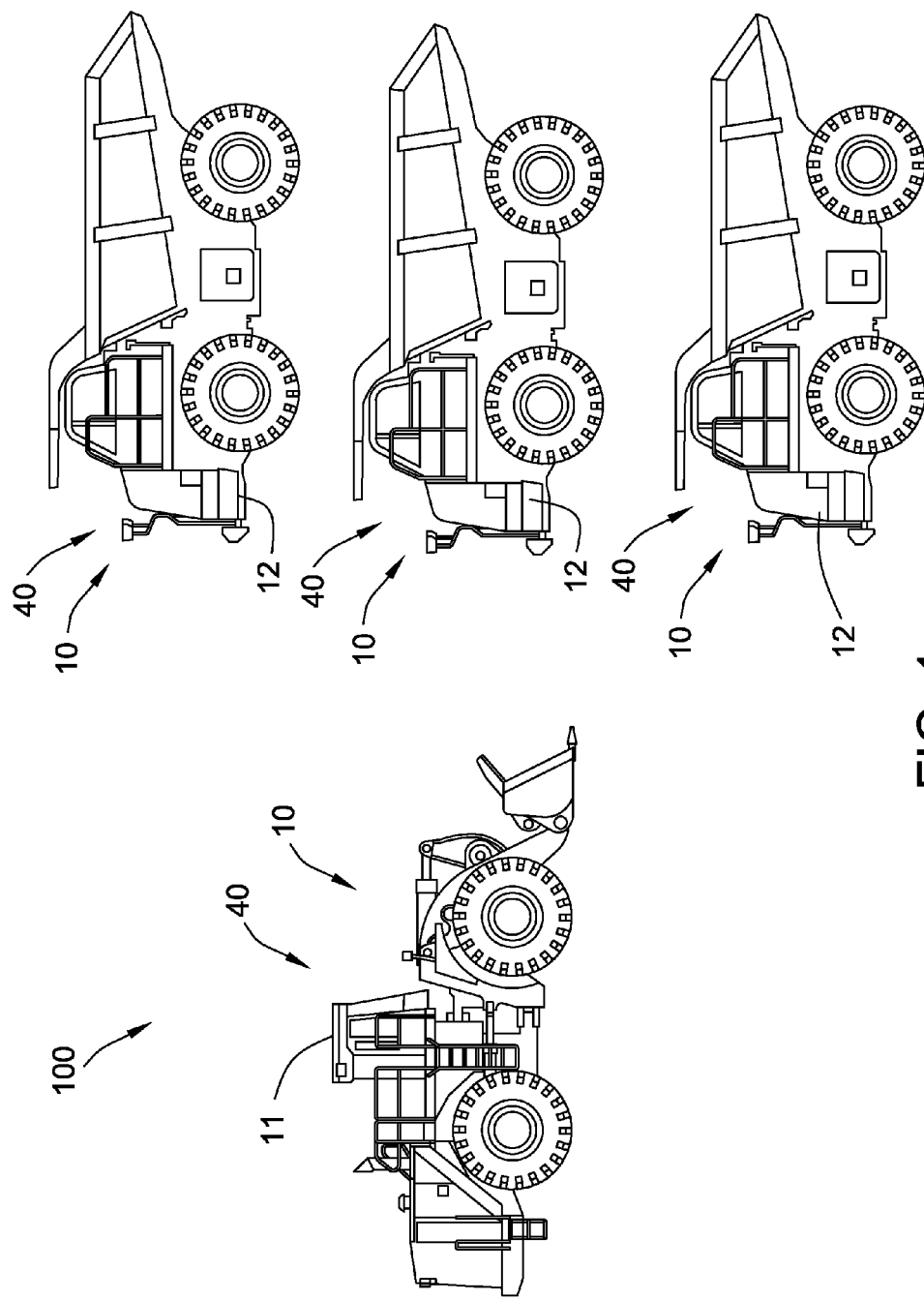
FIG. 1 depicts a schematic illustration of a work site at which machines incorporating the principles disclosed herein may be used.

FIG. 1 illustrates an exemplary work site 100 at which a plurality of mobile machines 10 may operate in an autonomous, a semi-autonomous, or a manual manner. Work site 100 may include, for example, a mine site, a landfill, a quarry, a construction site, a road work site, or any other type of work site. Machines 10 may perform any of a plurality of desired operations or tasks at work site 100, and such operations or tasks may require the machine to generally traverse work site 100. Any number of machines 10 may simultaneously and cooperatively operate at work site 100, as desired. Each machine 10 may embody any type of machine such as the wheel loader 11 and haul trucks depicted in FIG. 1, a service truck, a dozer, an excavator, or another type of mobile machine known in the art. As depicted, work site 100 includes a wheel loader 11 used to load material sequentially onto a plurality of machines such as haul truck 12. After each haul truck 12 is filled to a desired level, the haul truck 12 may travel to dump location before returning to be filled again.

As used herein, a machine 10 operating in an autonomous manner operates automatically based upon information received from various sensors without the need for human operator input. As an example, a load or haul truck that automatically follows a path from one location to another and dumps a load at an end point may be operating autonomously. A machine operating semi-autonomously includes an operator, either within the machine or remotely, who performs some tasks or provides some input, and other tasks are performed automatically and may be based upon information received from various sensors. As an example, a haul truck that automatically follows a path from one location to another but relies upon an operator command to dump a load may be operating semi-autonomously. In another example of a semi-autonomous operation, an operator may dump a bucket of an excavator in a haul truck and a controller may automatically return the bucket to a position to perform another digging operation. A machine being operated manually is one in which an operator is controlling all or essentially all of the functions of the machine. A machine may be operated remotely by an operator (i.e., remote control) in either a manual or semi-autonomous manner.

Figure 2:
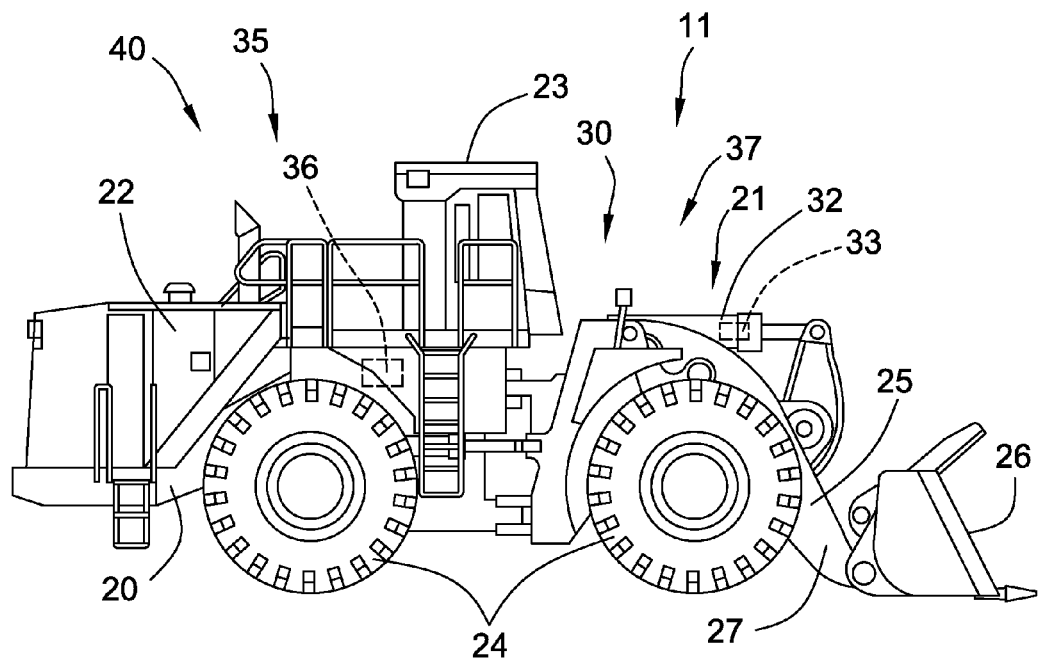
FIG. 2 depicts a diagrammatic illustration of a wheel loader.

FIG. 2 is a diagrammatic illustration of a wheel loader 11 that may be used in accordance with an embodiment of the disclosure. The wheel loader 11 may include a body 20 and a linkage 21. The body 20 houses a prime mover such as an engine 22 and a cab 23 in which an operator may be positioned. The engine 22 is operatively connected to and drives a ground engaging drive mechanism such as wheels 24.

The linkage 21 may include one or more lift arms 25 pivotally connected to the body 20. A work implement such as bucket 26 configured for movement relative to the wheel loader 11 may be provided at a distal end 27 of the lift arms 25. The wheel loader 11 may include a system such as an electro-hydraulic system generally indicated at 30 for moving the bucket 26 relative to the machine. More specifically, one or more lift cylinders (not shown) may operatively connect the body 20 to the lift arms 25 to facilitate raising and lowering of the lift arms. One lift cylinder may be provided for each lift arm 25, if desired. One or more tilt cylinders 32 may operatively connect the bucket 26 to the body 20 to facilitate rotation of the bucket relative to the lift arms 25. The lift cylinders and tilt cylinders 32 may be electro-hydraulic cylinders operatively connected to the hydraulic system 30.

Wheel loader 11 may be equipped with a plurality of sensors that provide data indicative, directly or indirectly, of the performance or conditions of various aspects of the machine. One or more sensors may be provided for sensing the load on or within the bucket 26. In one embodiment, one or more hydraulic pressure sensors 33 may be associated with some or all of the hydraulic cylinders that are used to control the bucket 26. By monitoring the pressure and pressure changes in the hydraulic cylinders, specific pressure characteristics may be monitored that are indicative of the load on or within the bucket 26. Other types of sensors are also contemplated. In one example, the weight of the bucket 26 or the pressure within the hydraulic cylinders will be known in an unloaded state. By monitoring the pressure and pressure changes within one or more of the hydraulic cylinders associated with the bucket 26, the load within the bucket may be determined.

A control system 35 as shown generally by an arrow in FIG. 2 indicating association with the wheel loader 11 may be provided to control the operation of the machine. The control system 35 may include an electronic control module such as controller 36. The controller 36 may receive operator input command signals and control the operation of the various systems of the wheel loader 11. The control system 35 may include one or more input devices (not shown) to control wheel loader 11 and one or more sensors, including the hydraulic pressure sensors 33 to provide data and other input signals representative of various operating parameters of the wheel loader 11.

The controller 36 may be an electronic controller that operates in a logical fashion to perform operations, execute control algorithms, store and retrieve data and other desired operations. The controller 36 may include or access memory, secondary storage devices, processors, and any other components for running an application. The memory and secondary storage devices may be in the form of read-only memory (ROM) or random access memory (RAM) or integrated circuitry that is accessible by the controller. Various other circuits may be associated with the controller such as power supply circuitry, signal conditioning circuitry, driver circuitry, and other types of circuitry.

The controller 36 may be a single controller or may include more than one controller disposed to control various functions and/or features of the wheel loader 11. The term "controller" is meant to be used in its broadest sense to include one or more controllers and/or microprocessors that may be associated with the wheel loader 11 and that may cooperate in controlling various functions and operations of the wheel loader. The functionality of the controller 36 may be implemented in hardware and/or software without regard to the functionality. The controller 36 may rely on one or more data maps relating to the operating conditions of the wheel loader 11 that may be stored in the memory of controller. Each of these maps may include a collection of data in the form of tables, graphs, and/or equations. The controller 36 may use the data maps to maximize the performance and efficiency of the wheel loader 11.

The control system 35 may include a load monitoring system generally indicated at 37 for estimating the load of material within bucket 26. In operation, the controller 36 may be configured to receive signals from the pressure sensors 33. A data map of the load within the bucket 26 based upon the pressure within the hydraulic cylinders may be established and stored within the controller 36. Such maps may utilize various factors including the speed of the wheel loader 11, the position of the elements of the linkage 21 and the bucket 26 to determine the load within the bucket. In addition to determining the load within the bucket 26, the load monitoring system 37 may also be configured to track or add the weight of a plurality of sequential loads which may be used to determine the total weight of the loads that have been emptied into a haul truck 12.

The control system 35 may also include a short range machine-to-machine or peer-to-peer communications system 40. As described in more detail below, peer-to-peer communications system 40 may include components to enable wheel loader 11 to send and receive signals to and from other machines over a relatively short distance without the need for a network node remote from the machines.

Figure 3:
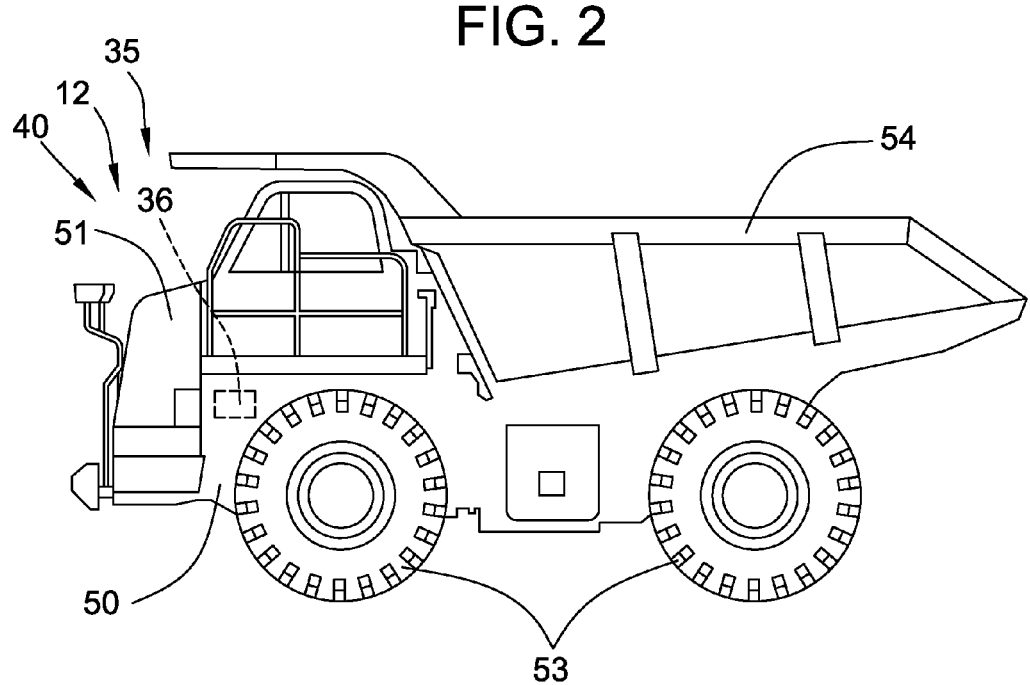
FIG. 3 depicts a diagrammatic illustration of a haul truck.

FIG. 3 is a diagrammatic illustration of a haul truck 12 that may be used in accordance with an embodiment of the disclosure. The haul truck 12 may include a chassis 50 that supports a prime mover such as an engine 51 and a cab 52 in which an operator may be positioned. The engine 51 is operatively connected to and drives a ground engaging drive mechanism such as wheels 53. Dump body 54 is pivotally mounted on the chassis 50 and receives a payload to be hauled from one location to another.

Haul truck 12 may include a control system 35 and a controller 36 generally similar or identical to the control system and controller of the wheel loader 11. In addition, control system 35 of haul truck 12 may include a peer-to-peer communications system 40 generally similar or identical to the peer-to-peer communications system of wheel loader 11.

Figure 4:
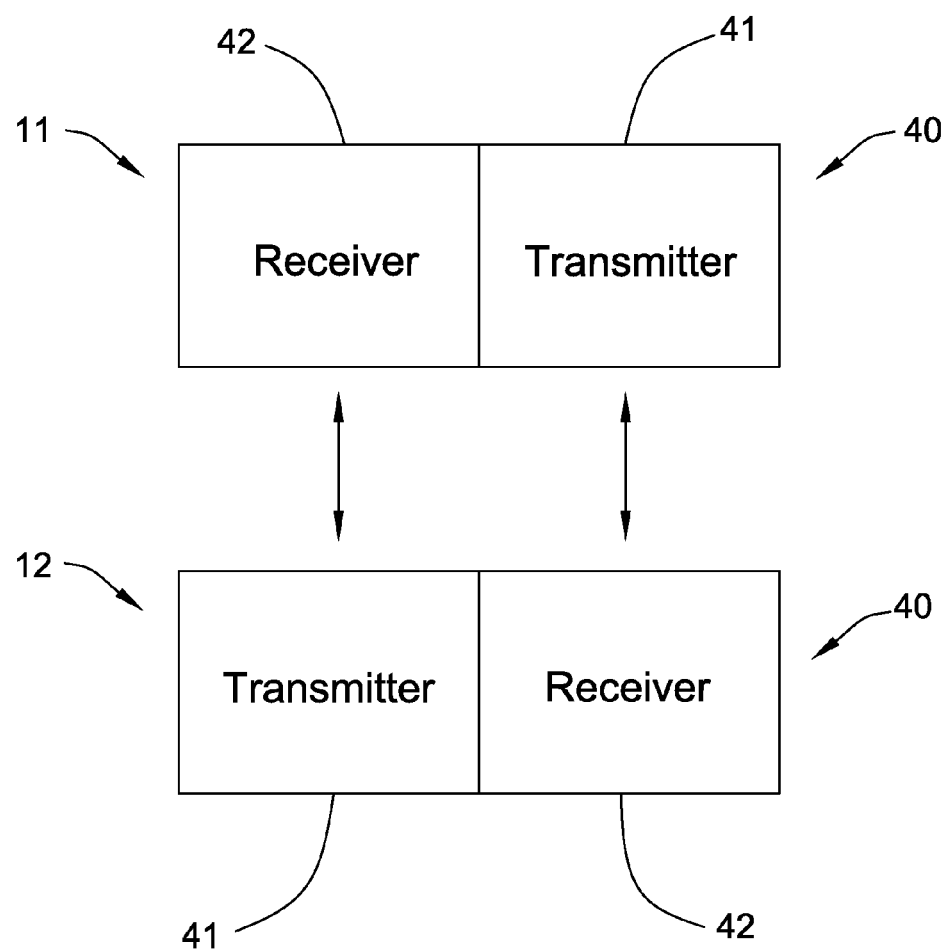
FIG. 4 depicts a schematic illustration of a wireless communications system.

In one embodiment depicted in FIG. 4, each peer-to-peer communications system 40 may include a peer-to-peer transmitter system 41 for transmitting signals from one peer-to-peer communications system and a peer-to-peer receiver system 42 for receiving signals from a peer-to-peer transmitter system of another peer-to-peer communications system. In some instances, the peer-to-peer transmitter system 41 and the peer-to-peer receiver system 42 may be combined as a transceiver system. In other instances, a machine may only include a peer-to-peer transmitter system.

Peer-to-peer communications system 40 may implement any desired protocol including any of a plurality of communications standards. The desired protocols will permit communication between machines over a relatively short distance without the need for a network node or network access point remote from the machines. In one example, the range of the peer-to-peer communications system may be 30 m or less. In addition, in order to reduce latency and simplify the system, for any systems that include a network node or access point, such network nodes or access points may be located or positioned on one of the machines between which communication is being effected.

In one example, the peer-to-peer communications system 40 may utilize a wireless personal area network such as Bluetooth® LE ("Bluetooth® Smart") or another personal area network or a local area network such as IEEE 802.11b or 802.11g. In a system utilizing a Bluetooth® Smart system or protocol, the peer-to-peer communications system 40 may operate to automatically pair the communication systems of two machines 10 and then transmit signals directly between the peer-to-peer communications systems of the machines. In another embodiment, one of the machines 10 may include a network node with which each peer-to-peer communications systems 40 may communicate. In still another example, a network node may be activated on one of the peer-to-peer communications systems 40 and the peer-to-peer communications systems communicate through the network node. Other communications systems and configurations are contemplated.

Figure 5:
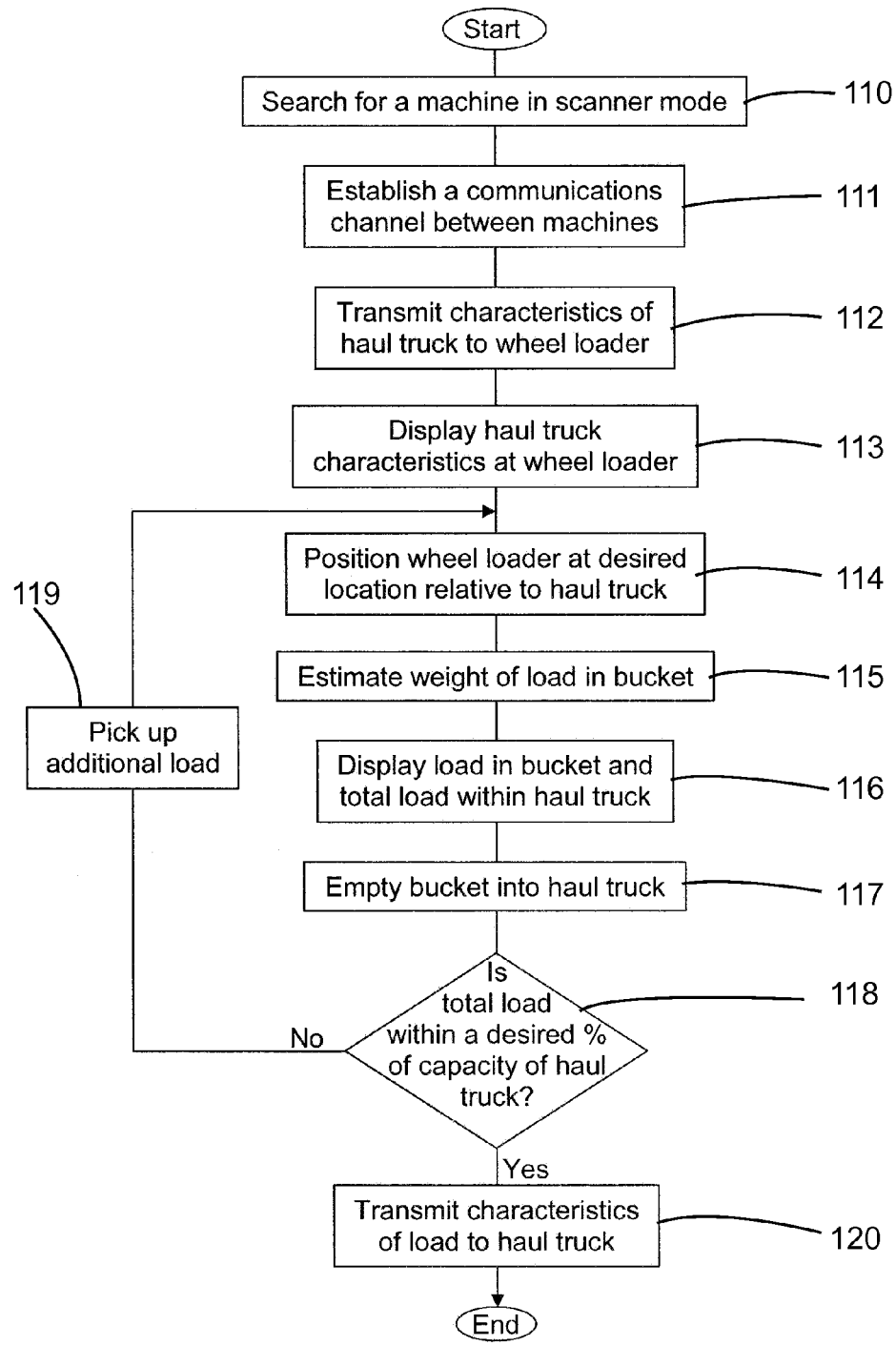
FIG. 5 depicts a flowchart illustrating a loading operation of a haul truck.

FIG. 5 depicts a flowchart of an exemplary operation of a wheel loader 11 loading a haul truck 12 with each machine utilizing a peer-to-peer communications system 40 as described herein. In the exemplary operation, the peer-to-peer communications systems 40 are utilizing Bluetooth® Smart system or protocol. At stage 110, the wheel loader 11 may be operating in a "master" or "advertising" mode in which it is searching for one or more machines that are in "slave" or "scanner" mode. Upon the relative distance between wheel loader 11 and one of the haul trucks 12 becoming sufficiently small (i.e., being within the range of the peer-to-peer communications systems 40), the peer-to-peer communications systems of the two machines will establish a communications channel or connection or become "paired" at stage 111.

The peer-to-peer transmitter system 41 of the peer-to-peer communications system 40 of the haul truck 12 may transmit at stage 112 one or more characteristic associated with the operation of the haul truck to the peer-to-peer receiver system 42 of the peer-to-peer communications system of the wheel loader 11. The characteristics may include the type of haul truck, its capacity, its position (e.g., GPS coordinates), and any other desired information. All or some of the characteristics associated with the haul truck 12 may be displayed at stage 113 on a display device (not shown) within the cab 23 of wheel loader 11. At stage 114, the wheel loader 11 may approach the haul truck 12 to begin loading. The wheel loader 11 may, if desired, use the GPS coordinates of the haul truck 12 together with its own GPS coordinates to assist in positioning the wheel loader at a desired location relative to the haul truck. In one example, the operator of the wheel loader 11 may use the GPS coordinates of the haul truck 12 to position the wheel loader in a desired position. In another example, the controller 36 of the wheel loader 11 may generate commands to move the wheel loader in a semi-autonomous manner to a desired position relative to the haul truck 12.

At stage 115, the load monitoring system 37 of wheel loader 11 may analyze the load within the bucket 26 and provide an estimate of its weight. The load monitoring system 37 may display within the cab 23 at stage 116 the current load within the bucket 26 as well as the total load moved since beginning a loading cycle for a particular haul truck. At stage 117, the wheel loader 11 may empty the bucket 26 into the dump body 54 of the haul truck 12. At decision stage 118, the operator of the wheel loader 11 or the load monitoring system 37 may compare the total load within the dump body 54 to the capacity of the haul truck 12.

If the total load within the dump body 54 is sufficiently less than a desired percentage of the capacity of the haul truck 12, the wheel loader 11 may pick up another load at stage 119 and the process of stages 115-118 repeated. If the total load within the dump body 54 is within a desired percentage of the capacity of the haul truck 12, the process of loading the haul truck 12 may be terminated. The fully loaded haul truck 12 may proceed to its dump location and the wheel loader may begin loading an unloaded haul truck.

If desired, peer-to-peer transmitter system 41 of the peer-to-peer communications system 40 of the wheel loader 11 may transmit at stage 120 the total load within the dump body 54 of the haul truck 12 to the peer-to-peer receiver system 42 of the peer-to-peer communications system of the haul truck. In addition, the peer-to-peer communications system 40 of the wheel loader 11 may also transmit information or characteristics of the material such as its type (e.g., coarse aggregate, road mix, pea gravel, sand, etc.) to the peer-to-peer communications system of the haul truck 12. The information regarding the load within the haul truck 12 may be stored in the memory of its controller 36 and communicated to another system such as when leaving the loading location or upon reaching a dump location.

If desired, the total load within the haul truck 12 and other information regarding the load may also be stored within the controller 36 of the wheel loader 11 and communicated to another system, such as by another communications system associated with the control system 35, either while the wheel loader is operating or as part of a management report upon completion of a shift, a predetermined time, or a specified number of loading operations.

It should be noted that, if desired, the peer-to-peer communications system 40 of the wheel loader 11 may be configured to permit simultaneous pairing with the peer-to-peer communications systems of more than one haul truck 12. Further, although described in the context of a wheel loader 11 and a plurality of haul trucks 12, the system and process described above may be applicable with an excavator (not shown) or another material moving machine and a plurality of haul trucks.

Figure 6:
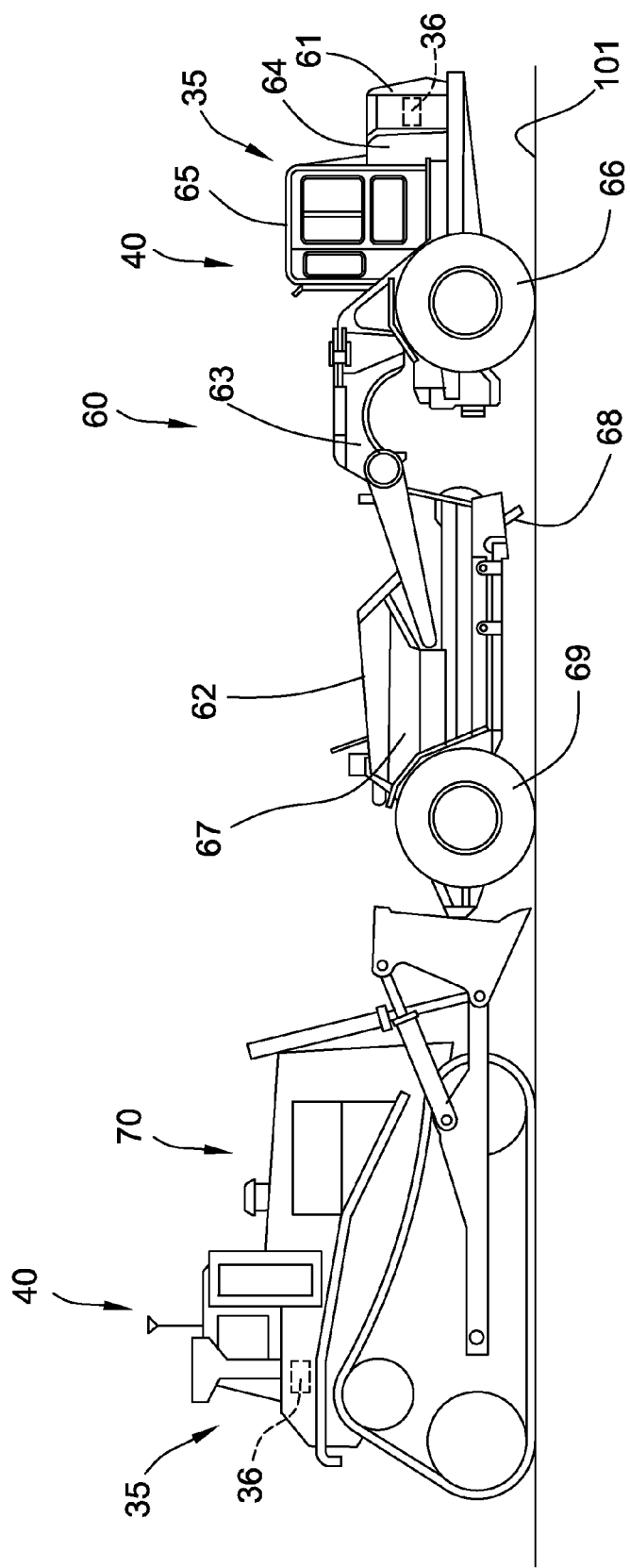
FIG. 6 depicts a diagrammatic illustration of a dozer and a wheel tractor scraper.

In some instances, rather than using the peer-to-peer communications system 40 to exchange information between machines about the characteristics of the machines or a load within one of the machines, the peer-to-peer communications system may be used to exchange information regarding operating characteristics of a pair of machines. Referring to FIG. 6, a diagrammatic illustration of a wheel tractor scraper 60 and a track-type tractor such as a dozer 70 is depicted. The wheel tractor scraper 60 may include a tractor portion 61 and a scraper portion 62 that are pivotally coupled through an articulation hitch 63. The tractor portion 61 may include a prime mover such as an engine 64 and a cab 65 in which an operator may be positioned. The engine 64 is operatively connected to and drives a ground engaging drive mechanism such as front wheels 66. The scraper portion 62 may include a bowl 67 and a ground engaging work implement 68 configured to engage the work surface 101 and direct material from the work surface into the bowl. In some instances, an additional prime mover (not shown) may be provided to drive rear wheels 69.

Wheel tractor scraper 60 may include a control system 35 and a controller 36 generally similar or identical to the control system and controller of the wheel loader 11. In addition, control system 35 of wheel tractor scraper 60 may include a peer-to-peer communications system 40 generally similar or identical to the peer-to-peer communications system of wheel loader 11.

While operating the wheel tractor scraper 60, the machine is propelled about the work site 100 and the ground engaging work implement 68 is positioned to engage the work surface 101. In some instances, the wheel tractor scraper 60 may not have enough power to force the desired amount of material into the bowl 67. For example, the work surface 101 may be too hard in certain areas or the material movement plan may call for a relatively deep cut into the work surface.

In order to effectively operate under conditions in which it may be difficult for a wheel tractor scraper 60 to follow a material movement plan, a second machine may be utilized to push or pull the wheel tractor scraper during all or portions of the loading phase at which the ground engaging work implement 68 engages the work surface 101. For example, a wheel tractor scraper 60 may be pushed by another machine such as a track-type tractor or dozer 70 as depicted in FIG. 6 or by another wheel tractor scraper.

In an operation in which a machine such as dozer 70 is utilized to push the wheel tractor scraper 60, it is desirable to coordinate the positions and speeds of the two machines to maneuver them to a desired engagement position and to provide cooperative operation during the joint operation. For example, it will typically be desirable to closely match the speeds of the two machines during the initial engagement and during the pushing operation to minimize any impact between the two machines.

Figure 7:
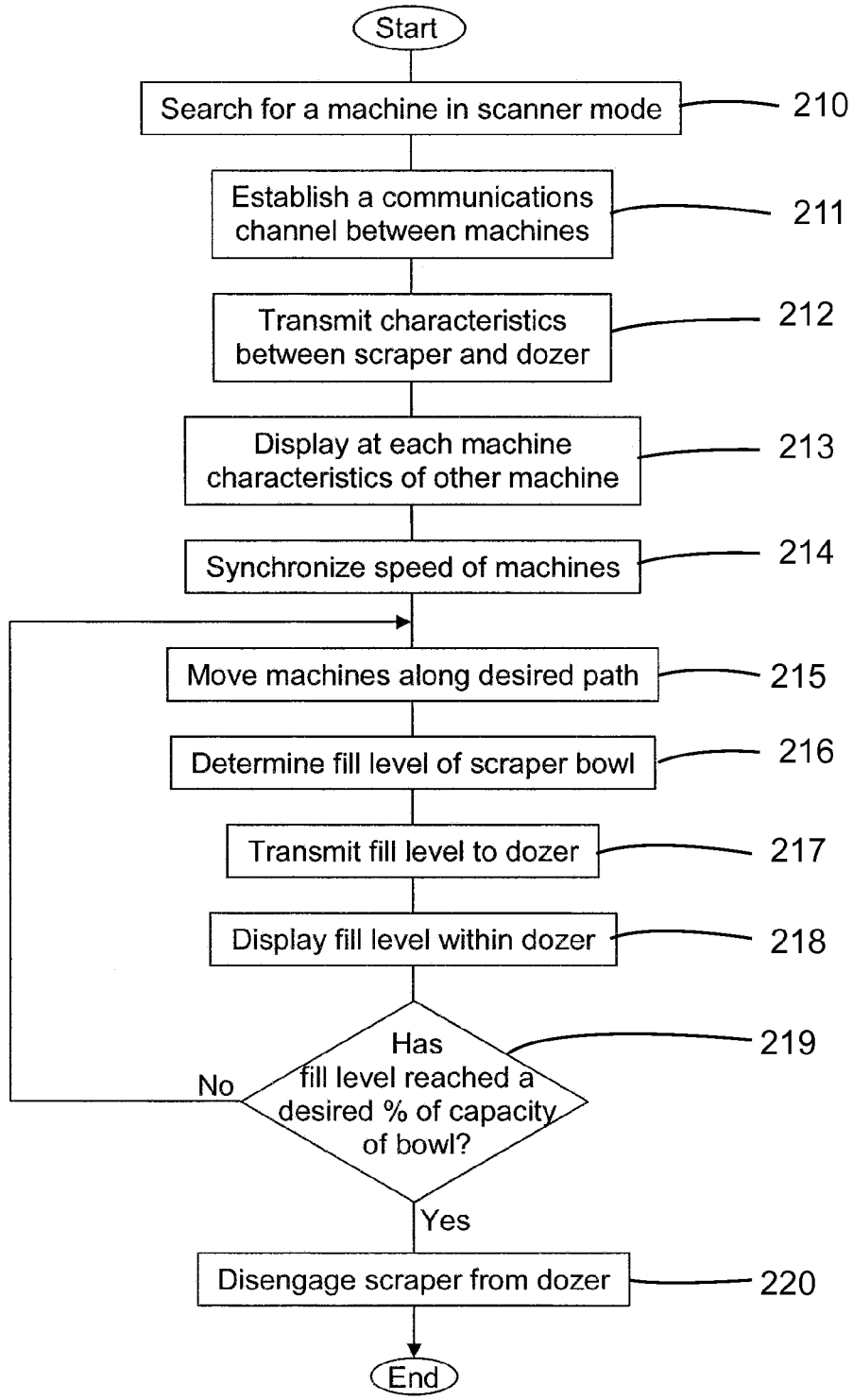
FIG. 7 depicts a flowchart illustrating a scraping operation with the assistance of a dozer.

FIG. 7 depicts a flowchart of an exemplary operation of a dozer 70 engaging and pushing a wheel tractor scraper 60 with each machine utilizing a peer-to-peer communications system 40 as described herein. In the exemplary operation, the peer-to-peer communications systems 40 are utilizing the Bluetooth® Smart system or protocol. At stage 210, the dozer 70 may be operating in a "master" or "advertising" mode in which it is searching for one or more machines that are in "slave" or "scanner" mode. Upon the relative distance between a wheel tractor scraper 60 and a dozer 70 becoming sufficiently small (i.e., being within the range of the peer-to-peer communications systems 40), the peer-to-peer communications systems of the two machines will establish a communications channel or connection or become "paired" at stage 211.

The peer-to-peer transmitter system 41 of the peer-to-peer communications system 40 of one or both of the machines may transmit at stage 212 signals indicative of the travel speed of the machine to the peer-to-peer receiver system 42 of the peer-to-peer communications system of the other machine. The signals may be received and the transmitted speed of the other machine may be displayed at stage 213 on a display device (not shown) within the cab of the machine receiving the signals.

At stage 214, one or both operators of the machines may coordinate or synchronize their speed to minimize any impact between the two machines. The two machines may travel together at stage 215 with the ground engaging work implement 68 in contact with the work surface 101 to fill the bowl 67. As the machines move along the work site 100 together, power to their respective ground engaging drive mechanisms may be coordinated by the operators based upon the conditions of the work surface 101 to maintain the desired speed while accounting for differences in slip between the drive mechanisms and the work surface. In an alternate embodiment, the controller 36 of one or both of the machines may generate signals to coordinate the speed of the two machines in a semi-autonomous manner.

At stage 216, a load monitoring system (not shown) of wheel tractor scraper 60 may analyze the load within the bowl 67 and provide an estimate of the fill level of the bowl. The peer-to-peer communications system 40 of the wheel tractor scraper 60 may transmit at stage 217 signals indicative of the fill level of the bowl 67 to the peer-to-peer communications system 40 of the dozer 70, The controller 36 of the dozer may display at stage 218 the fill level of the bowl 67 within the cab of the dozer 70.

At decision stage 219, the operator of the dozer 70 may determine whether the fill level of the bowl 67 has reached a predetermined level or percentage of the capacity of the bowl.

If the fill level within the bowl 67 has not reached the predetermined level, the dozer 70 may continue to push the wheel tractor scraper 60 and the process of stages 215-218 repeated. If the fill level within the bowl 67 has reached the predetermined level, the dozer 70 may slow its speed relative to the wheel tractor scraper 60 at stage 220 and the operator of the wheel tractor scraper may raise the ground engaging work implement 68 above the work surface to terminate the process of loading the wheel tractor scraper 60. The fully loaded wheel tractor scraper 60 may proceed to a desired dump location and the dozer may begin assisting or pushing an unloaded wheel tractor scraper.

In an alternate embodiment, the operator of the wheel tractor scraper 60 may monitor the fill level of bowl 67 and raise the ground engaging work implement 68 above the work surface 101 when the bowl has reached a desired fill level. The operator of the wheel tractor scraper 60 may then increase the speed of the wheel tractor scraper to disengage the machine from the dozer 70. The operator of the dozer 70 may monitor the fill level of the bowl 67 of wheel tractor scraper 60 so as to have advanced notice as to when the scraper operator will likely be disengaging the wheel tractor scraper 60 from the dozer.

Figure 8:
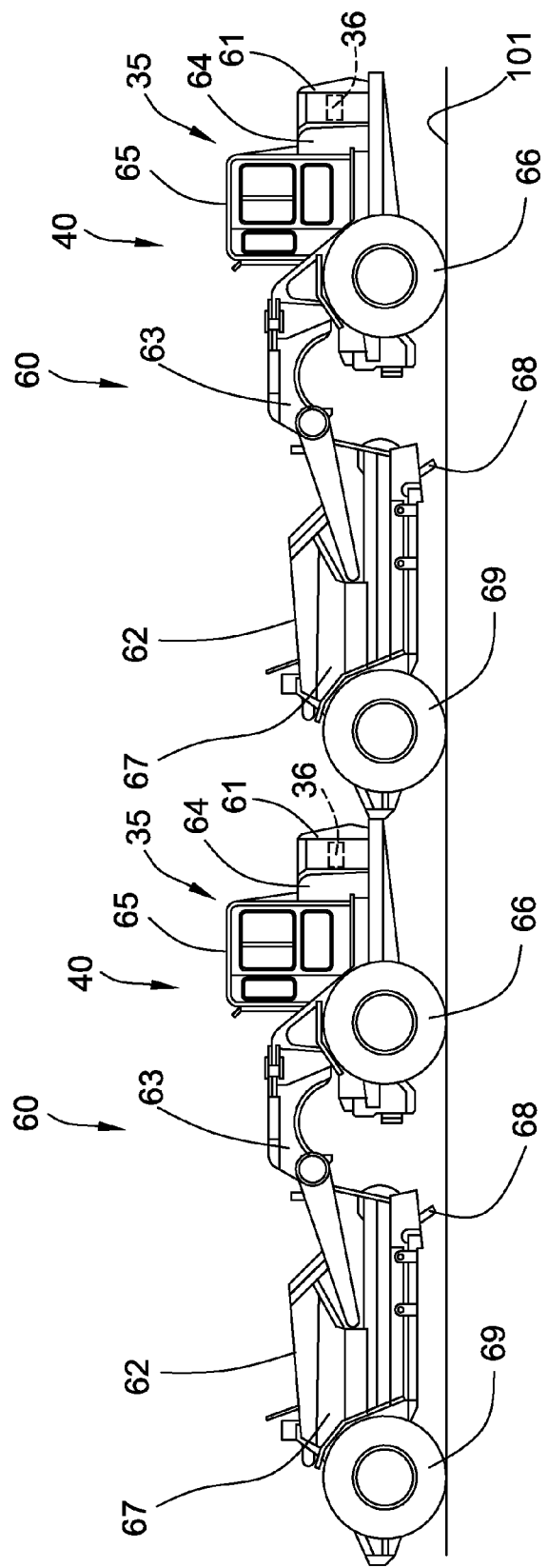
FIG. 8 depicts a diagrammatic illustration of a pair of wheel tractor scrapers.

In another example depicted in FIG. 8, two or more wheel tractor scrapers 60 may be coupled together and work in tandem or series. In such case, both wheel tractor scrapers 60 may provide a tractive force to propel the two machines and first one machine is loaded and then the other machine is loaded. Other configurations of multiple machine operation are contemplated.

The operation of the two wheel tractor scrapers 60 may be similar to that depicted in the flowchart of FIG. 7 but the peer-to-peer communications systems 40 may also exchange information regarding the fill level of the bowl 67 of the other machine so that the operators know when to engage and disengage their respective ground engaging work implements 68 from the work surface 101.

Figure 9:
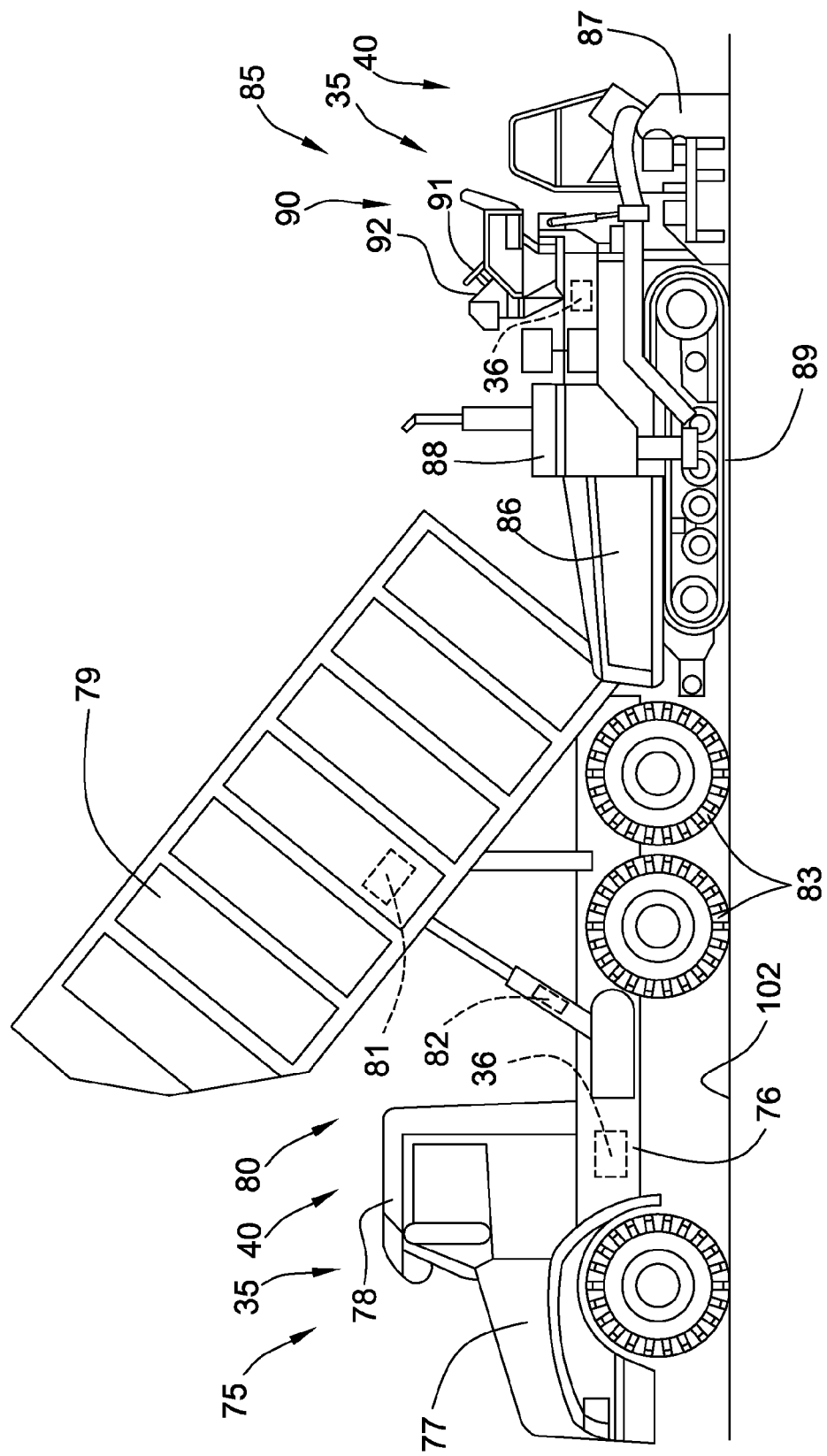
FIG. 9 depicts a diagrammatic illustration of a haul truck and a paving machine.

In still another example depicted in FIG. 9, a supply machine such as a haul truck 75 and a paving machine 85 may operate together to pave a work surface 102 such as a road. Haul truck 75 may include a chassis 76 that supports a prime mover such as an engine 77 and a cab 78 in which an operator may be positioned. The engine 77 is operatively connected to and drives a ground engaging drive mechanism such as wheels 83. Dump body 79 is pivotally mounted on the chassis 76 and receives a payload to be hauled from one location to another. Haul truck 75 may also include a load monitoring system 80 for determining the load or amount of material within the dump body 79. A temperature sensor 81 and a position sensor 82 may be associated with the dump body 79. The temperature sensor 81 may be used to monitor the temperature of the load (e.g., paving material) within the dump body 79 and the position sensor 82 may be used to monitor the position of the dump body to control the flow of material from the dump body.

Haul truck 75 may include a control system 35 and a controller 36 generally similar or identical to the control system and controller of the wheel loader 11. In addition, control system 35 of haul truck 75 may include a peer-to-peer communications system 40 generally similar or identical to the peer-to-peer communications system of wheel loader 11.

Paving machine 85 may include a hopper 86 for storing paving material supplied via haul truck 75 and a screed 87 for working paving material in a conventional manner. A conveyor system (not shown) transfers paving material from the hopper 86 to the screed 87. A prime mover such as engine 88 may be operatively connected to a ground engaging drive mechanism such as tracks 89. An operator station 90 may include a plurality of input devices 91 for controlling the paving machine 85 and one or more display device 92 for displaying information relevant to the operation of the machine and a paving operation.

Paving machine 85 may include a control system 35 and a controller 36 generally similar or identical to the control system and controller of the wheel loader 11. In addition, control system 35 of paving machine 85 may include a peer-to-peer communications system 40 generally similar or identical to the peer-to-peer communications system of wheel loader 11.

Figure 10:
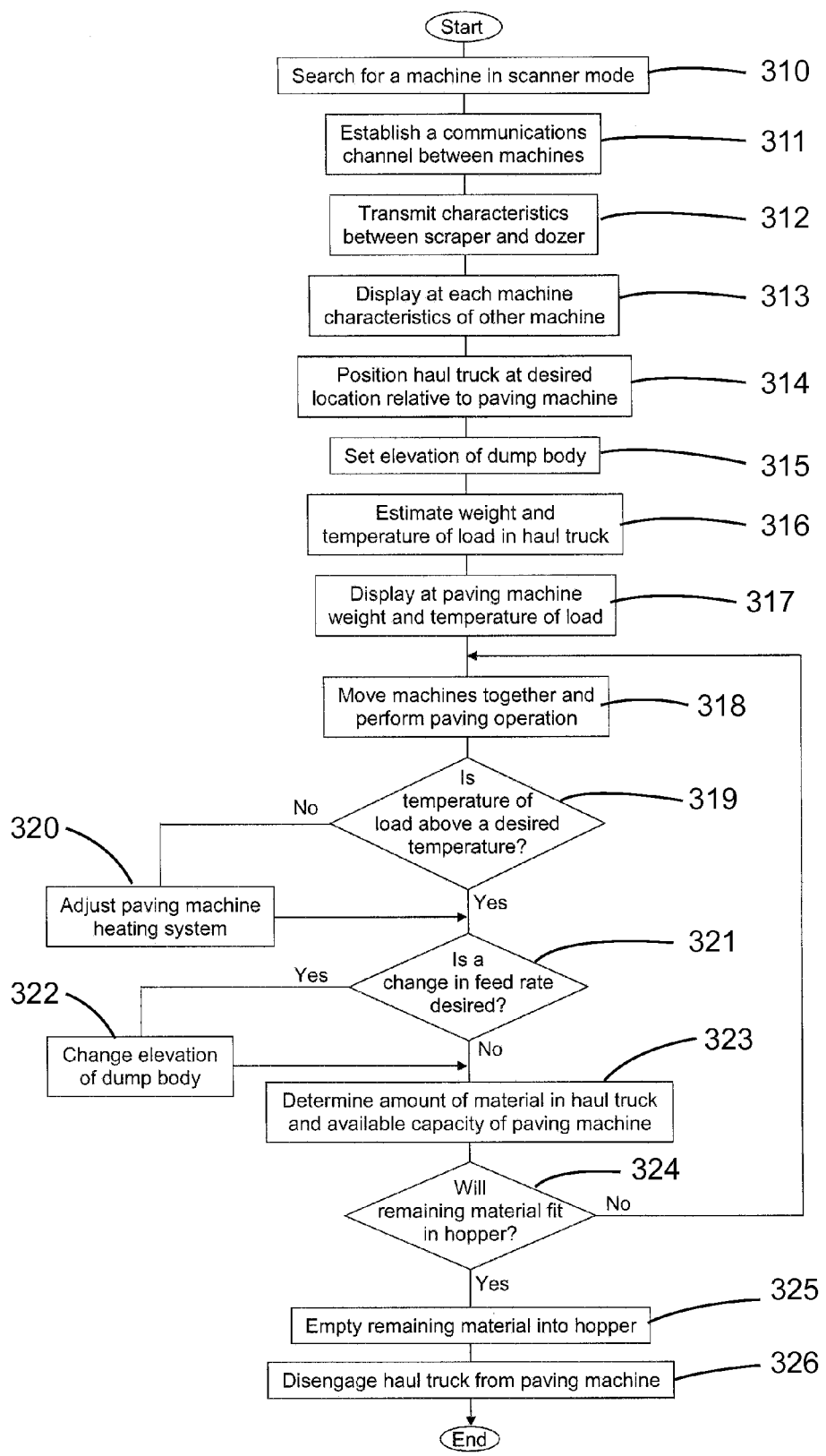
FIG. 10 depicts a flowchart illustrating paving operation using the haul truck and the paving machine.

In a paving operation in which a haul truck 75 and a paving machine 85 operate together, it may be desirable to coordinate the speeds of the haul truck and the paving machine as well as communicate other information to improve the performance or efficiency of the paving operation. Referring to FIG. 10, a flowchart of an exemplary paving operation utilizing the haul truck 75 and the paving machine 85 is depicted. At stage 310, the paving machine 85 may be operating in a "master" or "advertising" mode in which it is searching for one or more machines that are in "slave" or "scanner" mode. Upon the relative distance between haul truck 75 and paving machine 85 becoming sufficiently small (i.e., being within the range of the peer-to-peer communications systems 40), the peer-to-peer communications systems of the two machines will establish a communications channel or connection or become "paired" at stage 311.

The peer-to-peer transmitter system 41 of the peer-to-peer communications system 40 of the haul truck 75 may transmit at stage 312 one or more characteristics associated with the operation of the haul truck to the peer-to-peer receiver system 42 of the peer-to-peer communications system of the paving machine 85. The characteristics may include the type of haul truck, the amount and temperature of the load within the dump body 79, the position (e.g., GPS coordinates) of the machine, and any other desired information. In addition, the peer-to-peer transmitter system 41 of the peer-to-peer communications system 40 of the paving machine 85 may also transmit at stage 312 one or more characteristics associated with the operation of the paving machine to the peer-to-peer receiver system 42 of the peer-to-peer communications system of the haul truck 75. For example, the paving machine 85 may transmit its position to the haul truck 75 to simplify positioning of the haul truck relative to the paving machine.

At stage 313, all or some of the characteristics associated with the haul truck 75 may be displayed on a display device 92 at the operator station 90 of paving machine 85 and all or some of the characteristics associated with the paving machine 85 may be displayed on a display device (not shown) within the cab 78 of haul truck 75. At stage 314, the haul truck 75 may approach the paving machine 85 to position the end of the dump body 79 above the hopper 86 of the paving machine. The haul truck 75 may, if desired, use the GPS coordinates of the paving machine 85 together with its own GPS coordinates to assist in positioning the haul truck relative to the paving machine. In one example, the operator of the haul truck 75 may use the GPS coordinates of the paving machine 85 to position the haul truck in a desired position. In another example, the controller 36 of the haul truck 75 may generate commands to move the haul truck in a semi-autonomous manner to a desired position relative to the paving machine 85.

At stage 315, the load monitoring system 80 of haul truck 75 may analyze the load within the dump body 79 and the peer-to-peer communications system 40 of the haul truck 75 and provide an estimate of the weight of the load to the peer-to-peer communications system 40 of the paving machine 85. In addition, the controller 36 of the haul truck 75 may also determine the temperature of the load within the dump body 79 based upon the temperature sensor 81 and the peer-to-peer communications system 40 of the haul truck 75 may also transmit the temperature information to the paving machine 85. At stage 316, the controller 36 of the paving machine 85 may display on display device 92 at the operator station 90 the load within the dump body 79 and the temperature of the load.

The haul truck 75 may set the elevation of the dump body 79 at stage 317 to a desired level to fill the hopper 86 of the paving machine 85. At stage 318, the haul truck 75 and paving machine 85 may move together to begin the paving operation. In one embodiment, the haul truck 75 may be secured to the paving machine 85 and the drive system of the paving machine operates to propel both machines. In another embodiment, the paving machine 85 may establish the speed at which the pair of machines will operate and the peer-to-peer communications system 40 of the paving machine may transmit the speed to the peer-to-peer communications system 40 of the haul truck 75.

At decision stage 319, controller 36 of paving machine 85 may determine whether the temperature of the load within the haul truck 75 is above a predetermined temperature. If the temperature is above the predetermined temperature, the paving operation may continue as desired. If the temperature is below the predetermined temperature, the controller 36 of the paving machine 85 may adjust a heating system (not shown) within the paving machine or take any other desired action.

At stage 320, the controller 36 of paving machine 85 may determine the amount of material within the hopper 86. At decision stage 321, the controller 36 of paving machine 85 may determine whether to increase or decrease the feed rate of the material from the haul truck 75 based upon the amount of material entering from the haul truck and the amount of material leaving by the conveyor system. If a change in feed rate is desired, the peer-to-peer communications system 40 of the paving machine 85 may at stage 322 transmit a requested change to the peer-to-peer communications system 40 of the haul truck 75. In an alternate embodiment, the operator of the paving machine 85 may be able to control the elevation of the dump body 79 (and thus the feed rate) or the controller 36 of the paving machine may be able to control the elevation of the dump body in a semi-autonomous manner. If a change in feed rate is not desired, the paving operation may continue.

At stage 323, the load monitoring system 80 of the haul truck 75 may determine the extent or amount of material remaining in dump body 79 and the controller 36 of the paving machine 85 may determine the available capacity within the hopper 86. At decision stage 324, the controller 36 of one of the machines may determine whether all of the remaining material in the dump body will fit within the hopper 86. If the remaining material will not fit within the hopper 86, the paving operation may continue as desired. If the remaining material will fit within the hopper 86, the dump body 79 may be elevated at stage 325 by the operator of the haul truck 75 to empty the haul truck. The haul truck 75 may be disengaged from the paving machine 85 at stage 326 and a fully loaded haul truck moved into position relative to the paving machine in order to continue the paving operation in an efficient manner.

INDUSTRIAL APPLICABILITY

The industrial applicability of the system described herein will be readily appreciated from the forgoing discussion. The foregoing discussion is applicable to machines 10 that are operated at a work site 100 to move in a desired manner. Such system may be used at a mining site, a landfill, a quarry, a construction site, a roadwork site, a forest, a farm, or any other area in which coordinated movement between machines is desired.

Peer-to-peer communications system 40 operates to communicate information between machines without requiring systems or components remote from the machines that may increase latency, errors and/or costs. In one aspect, the peer-to-peer communications system 40 operates to improve information sharing between adjacent machines or machines that are interacting. Such system may permit the shared information to be displayed at the other machine thus simplifying tasks performed by an operator.

In an example in which a wheel loader 11 is used to load a haul truck 12, a load monitoring system may be eliminated from the haul trucks. Since such an operation typically uses fewer wheel loaders than haul trucks, including a load monitoring system on each wheel loaders rather than each haul truck reduces the capital cost of the system as well as the cost of ongoing maintenance. In addition, load monitoring systems are generally more accurate when being operated dynamically. As a result, more accurate results may generally be achieved by using load monitoring systems on the wheel loaders 11 (which are moved during loading and unloading) as compared to load monitoring systems on haul trucks 12 (which are typically static while being loaded).

In an example in which a wheel tractor scraper 60 is being pushed by a dozer 70, the improved communication provided by the peer-to-peer communications system 40 may permit the operator of the dozer to save time by disengaging from the scraper at the earliest possible opportunity. Such disengagement may save fuel and also permit the dozer 70 to push other wheel tractor scrapers 60 to increase the efficiency of the overall operation. In an example in which a pair of wheel tractor scrapers 60 are operating together, the improved communication provided by the peer-to-peer communications system 40 may permit the operators of both machines to engage and disengage their ground engaging work implements 68 from the work surface 101 in an efficient manner. The communications system may also permit the two wheel tractor scrapers 60 to be disengaged as soon as possible.

In an example in which a haul truck 75 is operating with a paving machine 85, the improved communication provided by the peer-to-peer communications system 40 may permit a more efficient paving operation by communicating the temperature of the paving material within the haul truck 75 to the paving machine 85 in real time. This may permit the operator of the paving machine 85 to make an adjustments desirable or necessary to maintain the desired paving performance. In addition, the improved communication may also permit optimization of the flow rate of the paving material. Further, communication of the load within the haul truck 75 and the available capacity within the hopper 86 of paving machine 85 may permit the haul truck to empty its load into the hopper as soon as enough capacity within the hopper is available. The empty haul truck may then disengage from the paving machine 85 and a fully loaded haul truck may be positioned adjacent the paving machine. Such an operation may increase the efficiency of the paving operation by switching the loaded haul truck for the empty haul truck while the paving machine continues to operate or by minimizing any wait time for the arrival of a fully loaded haul truck.

In any system utilizing coordinated movement of two machines, it may be desirable to use the peer-to-peer communications system 40 to coordinate and/or optimize the true ground speeds of the two machines. For example, the machines may have different ground engaging drive mechanisms that have different slip rates relative to the work surface 101. In addition, the differences in the slip rates may change depending on the characteristics of the material and the environmental conditions of the work surface. As a result, it may be desirable or necessary to set the commanded speed of each machine differently in order to match or synchronize the true ground speed of a pair of machines that are operating together. As an example, it may be desirable to set a commanded speed for a first machine that has a relatively high slip rate at 2.5 mph, which will result in a true ground speed of 2.2 mph. In contrast, the commanded speed for a second machine that has a relatively low slip rate may be set at 2.3 mph, which will also result in a true ground speed of 2.2 mph. In such example, improved communication between the two machines is desirable to synchronize the operation of the two machines and increase the efficiency of their performance.

It will be appreciated that the foregoing description provides examples of the disclosed system and technique. However, it is contemplated that other implementations of the disclosure may differ in detail from the foregoing examples. All references to the disclosure or examples thereof are intended to reference the particular example being discussed at that point and are not intended to imply any limitation as to the scope of the disclosure more generally. All language of distinction and disparagement with respect to certain features is intended to indicate a lack of preference for those features, but not to exclude such from the scope of the disclosure entirely unless otherwise indicated.

Recitation of ranges of values herein are merely intended to serve as a shorthand method of referring individually to each separate value falling within the range, unless otherwise indicated herein, and each separate value is incorporated into the specification as if it were individually recited herein. All methods described herein can be performed in any suitable order unless otherwise indicated herein or otherwise clearly contradicted by context.

Accordingly, this disclosure includes all modifications and equivalents of the subject matter recited in the claims appended hereto as permitted by applicable law. Moreover, any combination of the above-described elements in all possible variations thereof is encompassed by the disclosure unless otherwise indicated herein or otherwise clearly contradicted by context.

The invention claimed is:

1. A short range peer-to-peer communications system for communicating between mobile machines, comprising:
    a first machine including:
        a first prime mover;
        a first ground engaging drive mechanism operatively connected to the first prime mover to propel the first machine about a work site;
        a first controller configured to generate a first signal indicative of a characteristic associated with operating the first machine, and to control operations of at least one of the first prime mover or the first ground engaging drive mechanism, wherein the first signal includes a speed of the first machine;
        a first peer-to-peer transmitter system on the first machine for transmitting the first signal; and
    a second machine including:
        a second prime mover;
        a second ground engaging drive mechanism operatively connected to the second prime mover to propel the second machine about the work site;
        a second controller configured to control operations of at least one of the second prime mover or the second ground engaging drive mechanism;
        a second peer-to-peer receiver system for receiving the first signal directly from the first peer-to-peer transmitter system,
        wherein the first controller and the second controller are configured to coordinate the speed of the first machine and a speed of the second machine based at least in part on the first signal.

2. The short range peer-to-peer communications system of claim 1, wherein the first signal includes a capacity of the second machine.

3. The short range peer-to-peer communications system of claim 1, wherein the first signal includes a characteristic of a load within the first machine.

4. The short range peer-to-peer communications system of claim 3, wherein the characteristic of the load is a temperature of the load.

5. The short range peer-to-peer communications system of claim 3, wherein the characteristic of the load is a type of material making up the load.

6. The short range peer-to-peer communications system of claim 1, wherein the first signal includes an amount of material within the first machine.

7. The short range peer-to-peer communications system of claim 1, wherein the first signal includes a position of the first machine at the work site.

8. The short range peer-to-peer communications system of claim 1, wherein the second machine further includes a second peer-to-peer transmitter system on the second machine for transmitting a second signal indicative of a characteristic and the first machine further includes a first peer-to-peer receiver system on the first machine for receiving the second signal directly from the second peer-to-peer transmitter system.

9. The short range peer-to-peer communications system of claim 8, wherein the second signal includes a load within the second machine.

10. The short range peer-to-peer communications system of claim 9, wherein the first signal includes an available capacity of the first machine.

11. The short range peer-to-peer communications system of claim 9, wherein the first signal includes an amount of material within the first machine.

12. The short range peer-to-peer communications system of claim 9, wherein the second signal includes a characteristic of a load within the second machine.

13. The short range peer-to-peer communications system of claim 1, wherein the second signal includes a desired speed of the first machine.

14. A method of communication between mobile machines at a work site, comprising:
    propelling a first machine about the work site with a first prime mover operatively connected to a first ground engaging drive mechanism;
    controlling, using a first controller, operations of at least one of the first prime mover or the first ground engaging drive mechanism;
    generating, using the first controller, a first signal indicative of a characteristic associated with operating the first machine, wherein the first signal includes a speed of the first machine;
    transmitting the first signal with a first peer-to-peer transmitter system;
    propelling a second machine about the work site with a second prime mover operatively connected to a second ground engaging drive mechanism;
    controlling, using a second controller, operations of at least one of the second prime mover or the second ground engaging drive mechanism using the controller;
    receiving the first signal directly from the first peer-to-peer transmitter system at a second peer-to-peer receiver system on the second machine; and
    coordinating, using the first controller and the second controller, the speed of the first machine and a speed of the second machine based at least in part on the first signal.

15. The method of claim 14, further including transmitting a second signal with a second peer-to-peer transmitter system on the second machine indicative of a characteristic associated with operating the second machine and receiving the second signal directly from the second peer-to-peer transmitter system at a first peer-to-peer receiver system on the first machine.

16. The method of claim 15, further including determining a load within the first machine based upon operation of the second machine.

17. The method of claim 15, further including a load within the first machine and an available capacity within the second machine.

18. The method of claim 15, further including synchronizing a speed of the first machine and the second machine.

19. The method of claim 15, further including positioning the first machine relative to the second machine.

* * * * *

UNITED STATES PATENT AND TRADEMARK OFFICE
CERTIFICATE OF CORRECTION

PATENT NO.        : 9,510,137 B2  
APPLICATION NO.   : 14/536844  
DATED             : November 29, 2016  
INVENTOR(S)       : McCoy et al.

Page 1 of 1

It is certified that error appears in the above-identified patent and that said Letters Patent is hereby corrected as shown below:

On the Title Page

Column 2, Item (74) (Attorney, Agent, or firm), Line 1, delete "Leydig Voit Mayer, Ltd." and insert -- Leydig, Voit & Mayer, Ltd. --.

Signed and Sealed this  
Fourth Day of April, 2017

Michelle K. Lee  
*Director of the United States Patent and Trademark Office*